United States Patent
Fichou et al.

(10) Patent No.: US 6,961,318 B2
(45) Date of Patent: Nov. 1, 2005

(54) DATA TRANSMISSION SYSTEM FOR RESERVING A VIRTUAL CONNECTION OVER MULTIPLE IP NETWORKS BY MEANS OF A RESERVATION

(75) Inventors: Aline Fichou, La Colle sur Loup (FR); Jacques Fieschi, Saint Laurent du Var (FR); Claude Galand, La Colle sur Loup (FR); Jean-Francois Le Pennec, Nice (FR)

(73) Assignee: International Business Machines Corporation, Armonk, NY (US)

( * ) Notice: Subject to any disclaimer, the term of this patent is extended or adjusted under 35 U.S.C. 154(b) by 870 days.

(21) Appl. No.: 09/850,862

(22) Filed: May 8, 2001

(65) Prior Publication Data

US 2001/0048682 A1 Dec. 6, 2001

(30) Foreign Application Priority Data

May 12, 2000 (EP) .............................. 00480042

(51) Int. Cl.⁷ .............................. H04J 3/16; H04L 12/28
(52) U.S. Cl. ....................................... 370/254; 370/468
(58) Field of Search ................................ 370/352, 401, 370/230, 468, 252, 431, 254

(56) References Cited

U.S. PATENT DOCUMENTS 5,600,638 A * 2/1997 Bertin et al. ............... 370/351
5,940,372 A * 8/1999 Bertin et al. ............... 370/238
6,374,301 B1 * 4/2002 Melen ......................... 709/232
6,490,278 B1 * 12/2002 Michelson et al. ......... 370/389

* cited by examiner

Primary Examiner—Duc Ho
(74) Attorney, Agent, or Firm—Greenblum & Bernstein P.L.C.; John R. Pivnichny

(57) ABSTRACT

Data transmission system for transmitting packets of data from a source workstation (10) to a destination workstation (40) wherein the packets of data are transmitted over at least a first IP network (14) and a second IP network (30) between an ingress node (20) connected to the source workstation in the first network and an egress node (38) connected to the destination workstation in the second network. The system comprises a local reservation server (26) in the first network accessible by the source workstation and a remote reservation server (42) in the second network accessible by the local reservation server. The local reservation server includes connection setup means for setting up a virtual connection meeting a predefined requirement of Quality of Service from the ingress node to the egress node in response to a request from the source workstation and bandwidth request means for requesting additional bandwidth in the second network to the remote reservation server.

8 Claims, 3 Drawing Sheets

DATA TRANSMISSION SYSTEM FOR RESERVING A VIRTUAL CONNECTION OVER MULTIPLE IP NETWORKS BY MEANS OF A RESERVATION

TECHNICAL FIELD

The present invention relates to the reservation of virtual connections with a Quality of Service in IP networks and relates in particular to a system and a method for reserving a virtual connection over multiple IP networks by means of a reservation server.

BACKGROUND

In any transmission wherein a connection is first established before the transmission takes place, bandwidth is reserved along the path used by the connection and error checking is taken into consideration along the path. The protocols using such an approach use a call-connect packet to initiate a session and a connect-confirm response packet to complete the call sequence.

The requirements of connection-oriented systems are that the route is determined at call set up time by allocating a virtual circuit between the two endpoints. At that time, all necessary resources on the virtual circuit are reserved and logical channels are allocated. It is only when the connection is cleared that the resources and logical channels are released.

For example, with Asynchronous Transfer Mode (ATM) networks, a call set up process is established using virtual paths/virtual circuits (VP/VC). All ATM communications are set up by using a controlled method which identifies the rights needed to establish each connection. Generally, connections are not established by end users but by the network devices or nodes. However, there is a trend today to use packet-switched telecommunications directly at IP (Internet Protocol) level which allows the end-users to establish directly the connections.

A connectionless transmission used for example at IP level, is a form of packet-transmission not requiring communications between the end devices before the transmission of data and therefore, is well-adapted to transmit short messages composed of a limited number of packets. Therefore, it is a data transfer without the use of virtual circuit. In simple bus or ring networks, there is no problem implementing connectionless systems because the path-choice is limited. However in meshed and complex networks, the problems are significantly different. Each router must have a large amount of intelligence to process the packet header, and the network requires an efficient mechanism to ensure that all routers or nodes have an up-to-date view of the overall topology.

The Resource Reservation Protocol (RSVP) is a network-control protocol that enables IP applications to obtain special Qualities of Service (QoS) for their data flows. It allows establishment of connection-oriented like communications with quality of service. But RSVP is not a routing protocol. Instead, it works in conjunction with routing protocols and installs the equivalent of dynamic access lists along the routes that routing protocols calculate. RSVP can be used by end-users to reserve bandwidth on the path to the destination on all involved routers. The limitation is that if the bandwidth is already used, there is no way to add more reserved communications. No control on the rights of the end-user to ask for bandwidth is provided.

Another difficulty with a current reservation protocol such as RSVP is that there is not enough scalability since each request has to be handled by each node in the path used by the connection. This problem is very important today when the path is established in a complex networking environment wherein the nodes being used in the path are in several networks which belong to different service and network providers.

SUMMARY OF THE INVENTION

The main object of the invention is to provide a system and a method for performing a centralized resource reservation in a data transmission system including multiple IP networks.

Another object of the invention is to provide a data transmission system for transmitting packets of data through multiple IP networks wherein a single reservation server is capable of setting up a virtual connection with a Quality of Service from a source workstation in a first network to a destination workstation in a second network.

Another object of the invention is to provide such a data transmission system wherein the reservation server setting up a virtual connection is associated with a modeling server for validating the request from a user and for performing the modeling of the multiple network allocated bandwidth.

The invention relates therefore to a data transmission system for transmitting packets of data from a source workstation to a destination workstation wherein the packets of data are transmitted over at least a first IP network and a second IP network between an ingress node connected to the source workstation in the first network and an egress node connected to the destination workstation in the second network. The system comprises a local reservation server in the first network accessible by the source workstation and a remote reservation server in the second network accessible by the local reservation server. The local reservation server includes connection setup means for setting up a virtual connection satisfying a predefined Quality of Service requirement from the ingress node to the egress node in response to a request from the source workstation and bandwidth request means for requesting additional bandwidth in the network to the remote reservation server.

According to another aspect, the invention relates also to a method for reserving a virtual connection by a source workstation using the above system, comprising the steps of sending a reservation request from the source workstation to the local reservation server, checking that the request may be validated in view of information about the user of the source workstation accessible by the local reservation server, verifying that the capacity of the first and second networks enables to meet the requirements of the request, and setting up a virtual connection from the ingress node to the egress node when the capacity of the first and second networks enables to meet the request requirements.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
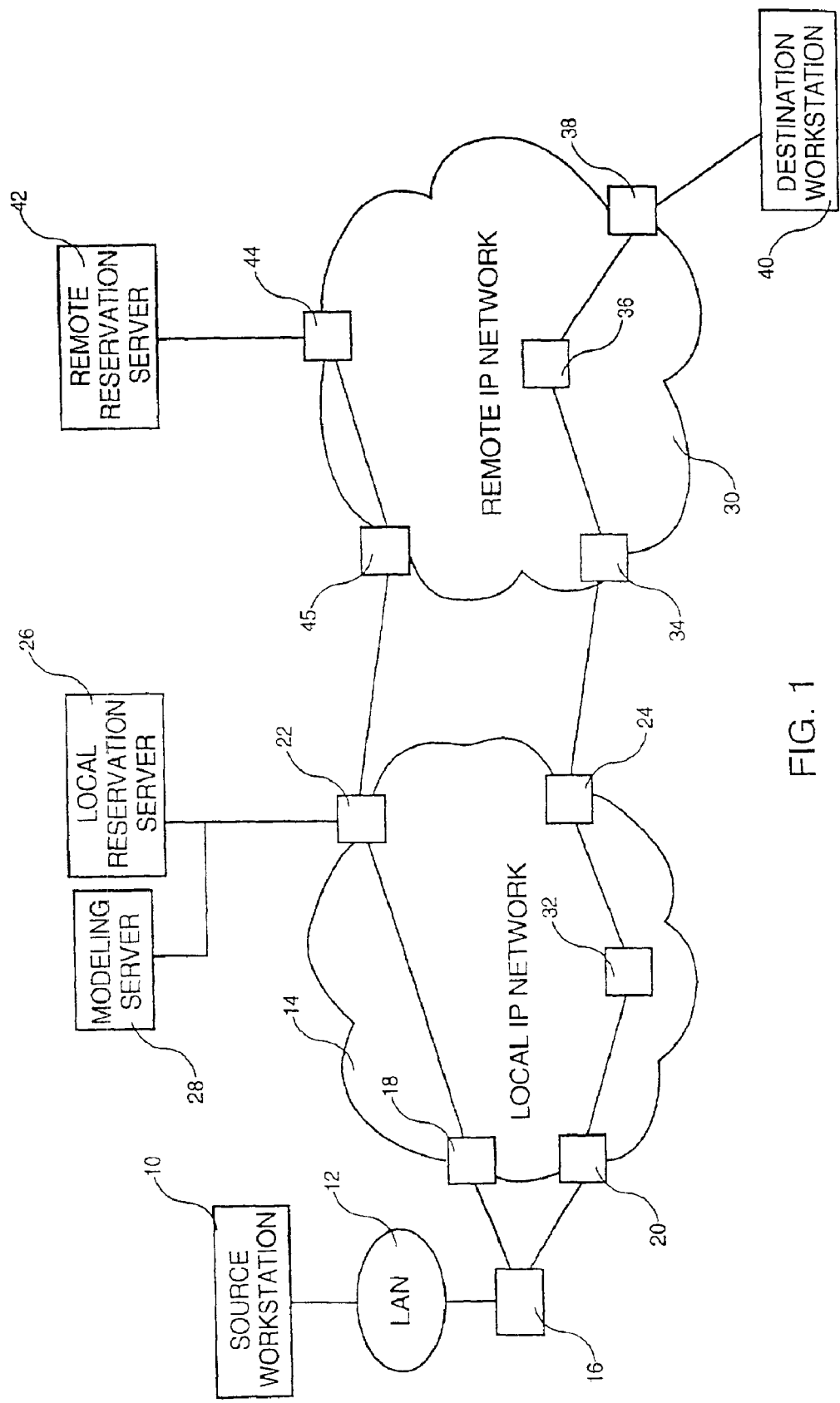
FIG. 1 represents a block-diagram of a data transmission system including two IP networks wherein the local network is equipped with a local reservation server and a modeling server and the remote network is equipped with a remote reservation server.

In reference to FIG. 1, a data transmission system according to the invention can include a source workstation 10 attached to a LAN 12 which can access an IP network 14 through a router 16. The router 16 is connected physically to several edge devices such as edge nodes 18 or 20, which are themselves connected to edge nodes 22 or 24 through IP network 14. A local reservation server 26 according to the invention may be accessed by any workstation such as the source workstation 10.

As described below, the local reservation server 26 includes connection setup capability for setting up a virtual connection satisfying a predefined Quality of Service requirement from an ingress node to an egress node in response to a request from the source workstation. Server 26 also includes a bandwidth request capability for requesting additional bandwidth in the network from a remote reservation server 42.

Local reservation server 26 is associated with a modeling server 28 which provides it with network traffic information such as the actual utilization of bandwidth and the current status of links in the network by gathering data activity from the nodes of the network and possibly from additional network probes (not shown)

When a source workstation connected to ingress node 20 wants to send data packets to another workstation such as destination workstation connected to an egress node 38 in another IP network such as network 30, a virtual connection is established by local reservation server 26 through backbone nodes such as node 32 as far as edge node 24 in the first network 14, then to edge node 34 of the second network 30 through backbone nodes of this second network such as node 36 as far as egress node 38.

Of course, source workstation 10 may use the IP network in a non reserved mode as usual. But, according to the invention, it may request a reserved connection from the reservation server when needed by an application requiring a Specific Quality of Service. Such a reservation request may be made directly to the reservation server or may be a generic reservation request forwarded by router 16 to local reservation server 26. The local reservation server performs the necessary user authentication and checks if the reservation can be granted to this user. Such a check is made, according to the invention, by accessing the remote reservation server 42 connected to edge node 44 in the second network, which includes edge node 45 leading to the destination workstation 40. If the reservation can be granted to the user, the edge nodes involved in the connection (such as nodes 20, 24, 34 and 38) are informed of the new reserved flow. In parallel, the requesting workstation 10 is informed that it can proceed to the communication. A flow identification may be provided to speed up the recognition and validation of that flow at the ingress node 20.

A request from the user of workstation 10 arriving on local reservation server 26 is first identified; then modeling server 28 is asked by reservation server 26 to verify the global network capacity. If there is not enough bandwidth in network 30, modeling server 28 informs reservation server 26 that there is not enough bandwidth in some links of network 30. Then, local reservation server 26 calls remote reservation server 42 in order to get additional bandwidth for these links.

A principle of operation is to have a part of the bandwidth of network 30 completely managed by modeling server 28 and local reservation server 26. For example, 10% of the bandwidth on each link of network 30 maybe controlled by modeling server 28. This 10% may be split into 5% for classes of quality 1 and 5% for classes of quality 2. As long as this bandwidth is sufficient to manage local reservations using network 30 for their path, there is no need to communicate with remote reservation server 42 to get additional bandwidth. In this case, the only communication between the two reservation servers is for local reservation server 26 to tell ingress node 34 of network 30 to accept the reserved flows. Either egress node 24 provides the flow identification to ingress node 34 via a protocol such as an external gateway protocol or local reservation server 26 contacts remote reservation server 42 for updating ingress node 34. For a sake of understanding the invention, it is necessary to further discuss the functions of modeling server 28 associated with local reservation server 26. First, modeling server 28 manages network 14. It can get real traffic statistics by category and knows the level of reservation performed on this network. A certain amount of bandwidth is exempted from reservation to specific connections and is used for non-reserved connectionless traffic. All these measurements are done by links, either logical or physical, logical meaning the aggregation of several physical links.

For the management of the bandwidth belonging to network 30, each bandwidth type (several priority or classes of service may be defined) is managed by the modeling server 28 to integrate reserved traffic on higher classes and non-reserved traffic on lower classes. Several management methods may be used, depending upon local and remote capabilities.

Any attempt to directly reserve bandwidth may be suspended when the upper class on which this flow is mapped is full or presumed full because the reservations for this class have reached a limit. Additional bandwidth for this class has to be ordered by the local reservation server 26 through a request to the remote reservation server 42.

Bandwidth can be reserved until a limit is reached, the limit corresponding to the ratio found on network 14 between the real traffic and the reserved traffic. Additional bandwidth would be requested when this limit is reached. Note that a large number of flows are necessary to have good statistics results or a margin has to be defined.

As network 30 is informed via the remote reservation server 42 of the reserved flows, an alternate method is to wait for a message from the remote reservation server 42 that the real reserved traffic is above the percentage value predefined corresponding to the ratio between ordered bandwidth and used bandwidth for a class resulting in a new order from the local reservation server 26. In that case, the modeling server is only used to verify that the ordered bandwidth is lower that the reserved bandwidth on this class and that the message is appropriate.

The overall benefit of using a modeling server associated with the local reservation server is to avoid having to ask for bandwidth or to check whether the bandwidth is available along the path on all networks involved for each new reservation. The management of the reservation between networks is managed in a global way, each local modeling server managing a part of the bandwidth of the other networks.

Figure 2:
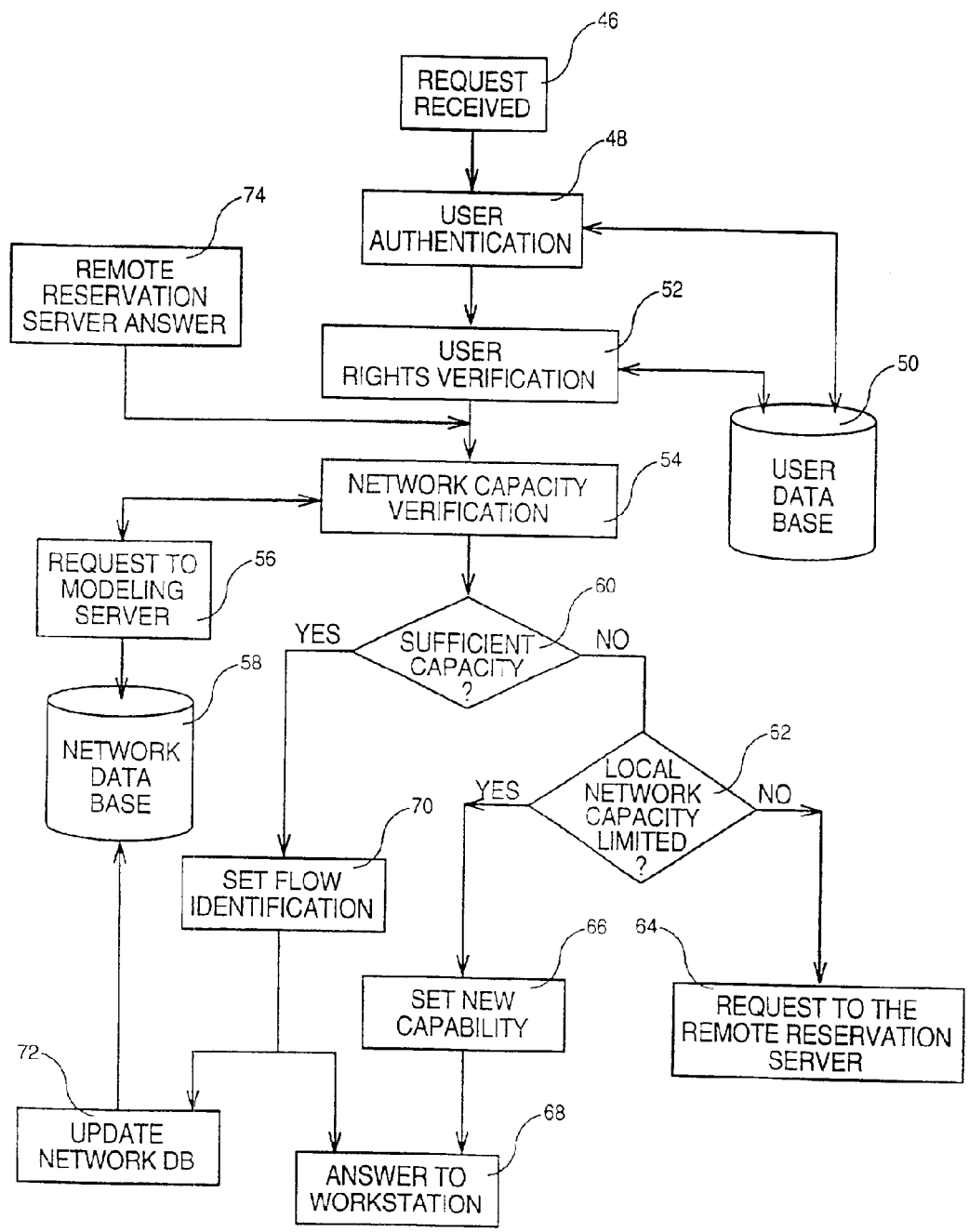
FIG. 2 is a flow chart representing the different steps performed in the local reservation server of the system illustrated in FIG. 1 when receiving a reservation request from a source workstation of the local network.

The steps performed in reservation server 26 when a request is sent by source workstation 10 are illustrated in FIG. 2. After receiving the request (step 46), the server starts a user authentication operation (step 48) which can be a LogonID/password verification or a more sophisticated authentication operation using certificates. This verification involves the use of a data base 50 storing the identification of each user and the user/customer profile when the user of the source workstation is one of a plurality of users associated with a customer of the server. Then, a user rights verification (step 52) is performed using the same data base 50 which defines for each user which kind of request that user is allowed to perform. The result of such a verification may be in terms of bandwidth required for a call, destination allowed, Quality of Service, and the like. As the reservation results in extra cost for the customer based on the type and duration of the communication to be performed, it is important to offer the customer a way to manage the authorization for each user supported by the customer. If the verification of the user rights fails, the request is rejected with a rejection message (not shown) sent to the workstation including a code for the rejection.

If the request is validated, the process checks the network capability (step 54). For this, a request is sent to the local modeling server 28 (step 56) which uses a network data base 58 to find the remaining capacity of each link in local network 14. Network database 58 stores information relating to the part of link bandwidth provided by the remote reservation servers. The capacity requested for setting up a virtual connection from ingress node 20 to egress node 24 has to meet Quality of Service parameters within network 14. After checking whether the network capacity is sufficient (step 60), a new test is performed in order to check whether the capacity limitation is only in network 14 or not (step 62). If capacity limitation arises outside network 14 and thus presumably in network 30, a request for additional bandwidth is sent to remote reservation server 42 (step 64).

If the capacity limitation originates in local network 14, a new proposal for a new less bandwidth-intensive connection can be made to (step 66) to the workstation. In such a case, the proposal, which may be either a lower bandwidth or a lower Quality of Service, is then sent back to the requesting workstation (step 68). At the same time, an updating message is transmitted to the edge nodes of the network.

If the network is able to support the request of the workstation, a flow identification is set (step 70). Such a flow identification includes not only a FlowID field but also the parameters such as source address, destination address, Quality of Service identifier, port number, duration, bandwidth, route or path within the network. Some of this information (such as bandwidth, duration, Quality of Service) is used to update network data base 58 (step 72) and an answer including the acceptance for the request is sent to the requesting workstation (step 68). Note that some parameters, such as source address, destination address, port number, route or path within the network and also Quality of Service, are sent to the edge nodes of the virtual connection.

Coming back to the request to the remote reservation server (step 64), it can be a simple additional bandwidth request for one link or a more complex request. This request, depending on the agreement with the owner of network 30, typically relates to a quantity of bandwidth able to satisfy not only a single reservation request but also a set of requests in order to avoid to make a request for each new flow. The remote reservation server provides an answer (step 74) with some additional bandwidth which is forwarded to the modeling server 28. At this stage, a new capacity verification is performed (step 54) including the additional bandwidth and then, the process continues as described above.

Figure 3:
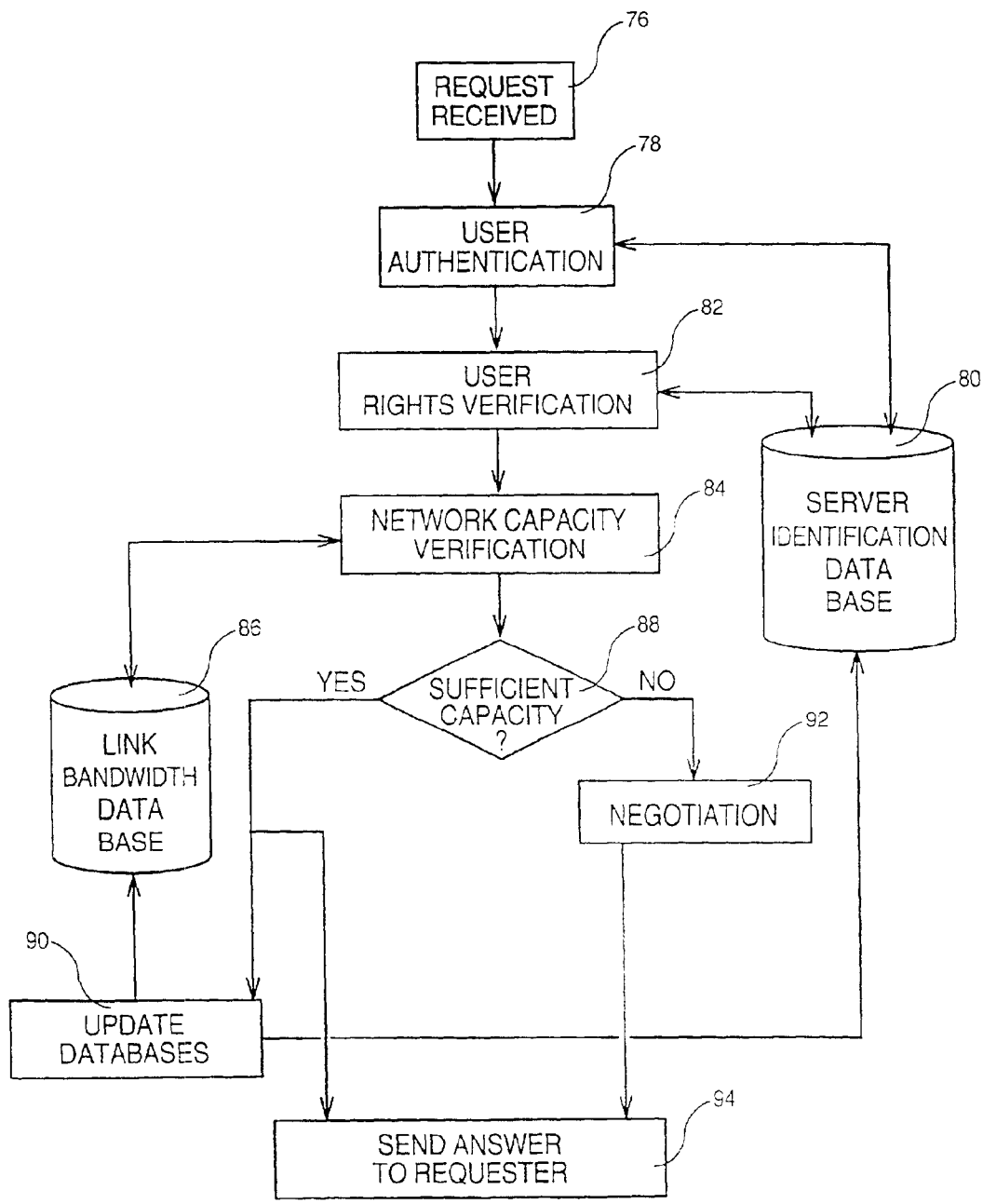
FIG. 3 is a flow chart representing the steps performed in the remote reservation server of the system illustrated in FIG. 1 when receiving a reservation request from the local reservation server.

FIG. 3 is a flow chart illustrating the steps performed in remote reservation server 42 when receiving a request from local reservation server 26. After receiving the request (step 76), the remote reservation server starts a server authentication (step 78) which can be a LogonID/password verification or a more sophisticated authentication using certificates. This verification involves the use of a data base 80 storing the identification of each server. Then, a server rights verification (step 82) is performed using the same data base 80 which defines the amount of bandwidth and the links on which on which server is allowed to perform. Each service provider that may request bandwidth on this network has a log for the amount of bandwidth requested including the duration of the request for dynamic requests. This is used for billing and accounting. Each network bandwidth provider will also know what is really used by each service provider which is information which can be used to manage oversubscription. If the verification of the user rights fails, the request is rejected with a rejection message (not shown) sent to the source workstation including a code for the rejection.

If the request is validated, the process checks the network capability (step 84) for this request by performing a lookup into a link bandwidth data base 86 which contains the amount of bandwidth requested by each service provider on each link and comparing the total requested bandwidth to the real capacity of each link in order to determine whether there is enough bandwidth to satisfy the request. Note that the process can also find alternate paths to meet the requirements.

Then, after checking whether the network capacity is sufficient (step 88), both server identification data base 80 and link bandwidth data base 86 are updated (step 90) if the capacity is sufficient. If not, a negotiation (step 92) is started between the remote reservation server and the local reservation server to give a proposition. Finally, in all cases, an answer is sent back to the local reservation server (step 94).

What is claimed is:

1. For use in a network included within a packet data transmission system in which data packets may be transmitted from a source system to a destination system through one or more of such networks, a connection control system comprising a local reservation server accessible to the source system, said local reservation server including logic for receiving a reservation request from the source system, said logic responding to a determination that sufficient bandwidth is available in both the local and each of the remote networks of the one or more of such networks on a path between the source system and the destination system to satisfy the reservation request by setting up a virtual connection between the source system and a virtual system, said logic responding to a determination that at least one of the remote networks has insufficient bandwidth available by sending a request for additional bandwidth to a reservation server in that remote network, and a modeling server associated with said local reservation server, said modeling server being capable of gathering utilization and link status information from the local and remote networks and supplying such gathered information to the local reservation server.

2. A connection control system as set forth in claim 1 wherein said local reservation server further includes a data base for storing the identity of each user allowed to access the local reservation server.

3. A connection control system as set forth in claim 2 wherein the data based also stores the access rights of each identified user.

4. A connection control system as set forth in claim 3 wherein said local reservation server further includes a network data base for storing information about each network through which virtual connections may be set up.

5. A method for controlling virtual connections between a source system and a destination system in a packet data transmission system comprising one or more networks, said method being implemented at a reservation server in the local network accessed by the source system and comprising the steps of:

receiving a reservation request from the source system;

responding to a determination that sufficient bandwidth is available in the local network and each remote network of the one or more of networks on a path between the source system and the destination system to set up the requested connection;

responding to a determination that sufficient bandwidth is unavailable in at least one remote network of the one or more of networks to send a request for additional bandwidth to a reservation server in said at least one remote network; and gathering utilization and link status information in a modeling server adjacent the local reservation server and supplying such gathered information to the local reservation server.

6. A method as set forth in claim 5 further including the step of maintaining a user data base at the local reservation server for storing the identity of each user allowed to access the local reservation server.

7. A method as set forth in claim 6 further including the step of storing the access rights of each user in the user data base maintained at the local reservation server.

8. A method as set forth in claim 7 including the additional setup of maintaining a network data base at the local reservation server, said network data base storing information about each network through which virtual connections may be set up.

* * * * *